United States Patent [19]

Lynch

[11] Patent Number: 4,682,347
[45] Date of Patent: Jul. 21, 1987

[54] TELEPHONE LINE SELECTION AND ISOLATION METHOD AND APPARATUS

[75] Inventor: Daniel Lynch, Jackson, N.J.

[73] Assignee: Keptel, Inc., Ocean, N.J.

[21] Appl. No.: 828,205

[22] Filed: Feb. 10, 1986

[51] Int. Cl.[4] .............................................. H04B 3/46
[52] U.S. Cl. ........................................... 379/29; 379/6
[58] Field of Search ................. 179/175.3 A, 175.3 F, 179/175.5 R, 81 R; 324/66

[56] References Cited

U.S. PATENT DOCUMENTS 3,711,661  1/1973  Garrett et al. ......................... 379/21

Primary Examiner—Stafford D. Schreyer
Attorney, Agent, or Firm—Kenyon & Kenyon

[57] ABSTRACT

Method and apparatus for selecting a single telephone line from among multiple line pairs at a location remote from the central office and isolating that line from the respective subscriber line to allow the performance of line tests on same. Line pairs are sampled sequentially for a short time interval of about 35 ms to determine whether a signal is present within an initial detection band, that band having a range about ±100 hz of the test signal frequency. If a signal is found, the system shifts to a validation mode to detect a signal within a range of about ±10 hz of the test signal frequency during a preselected long time interval. The system remains in validation mode for about six iterations of the validation routine, each long time interval being about 0.5 seconds duration. Upon finding a signal present at the end of each such validation cycle, the system disconnects the selected line from its respective subscriber line and begins performing line tests to diagnose problems.

19 Claims, 4 Drawing Figures

TELEPHONE LINE SELECTION AND ISOLATION METHOD AND APPARATUS

BACKGROUND OF THE INVENTION

This invention relates to the field of telephone equipment, and more particularly to the field of telephone test equipment.

The proliferation of subscriber-owned telephone equipment has raised a serious problem for telephone companies: in the event a subscriber reports a problem, the company will waste resources if it dispatches a service person to the subscriber location, only to learn that the problem originates in subscriber-owned equipment not provided by the company. Therefore, it would be highly advantageous for the telephone company to be able to determine quickly whether a reported problem arises in the telephone line or in the subscriber equipment.

The prior art gives little assistance to the telephone company in this situation. Most of the available art is directed to the situation in which a telephone installer needs to identify particular line pairs from among a plurality of lines, as when a service person is working on a multi-pair cable. In that situation, U.S. Pat. No. 3,427,538, to Bohnenblust teaches an arrangement whereby a workman at a remote location could apply a probe to a selected cable pair; the central office would then apply a signal to each cable pair in sequence until the test tone was detected at the remote location. This apparatus verifies reception of the tone by comparing signals passed through a delay circuit, using a coincidence technique. A similar system is shown in U.S. Pat. No. 3,559,055, to Thompson, showing an arrangement whereby the test signal is validated by a pulse recurrence timer. Other approaches, including that of Collier, U.S. Pat. No. 3,628,138, which teaches identification of a particular line pair by employing a modulated Gaussian noise source on the line, all include the requirement that a service person be physically present at the subscriber location in order to practice the inventions.

Beerbaum, in U.S. Pat. No. 3,912,882, recognizes this problem and proposes a partial solution. That disclosure places an apparatus at the subscriber location, coupled to a single telephone line. When the central office desires to check a line, it transmits a tone on that line. The apparatus detects the tone and disconnects the customer terminal equipment so that the central office can perform a prescribed series of line tests. At the conclusion of the testing, the apparatus reconnects the subscriber equipment.

This teaching addresses the demonstrated need, but it does so inefficiently and expensively, it being limited to a single telephone line. Therefore, at a subscriber location having more than one line, such as the typical 25-line termination block, one such apparatus would be required for every line. Clearly, a need exists to utilize a single apparatus to service a plurality of lines.

Moreover, Beerbaum's apparatus could not be adapted to a multi-line situation without serious disadvantage. This disclosure teaches that the check tone transmitted by the central office "must be in excess of about four seconds", and preferably is ten seconds. Therefore, the minimum time necessary to scan every line of a 25-pair termination block utilizing this apparatus would be 100 seconds, and preferably would be 250 seconds. This time is stated as being necessary in order to discriminate between the check tone and other signals appearing on the line.

Thus, notwithstanding the gains made by the prior art, the industry remains in need of a method for identifying a particular telephone line from among a multi-pair grouping and isolating that line, efficiently and quickly.

SUMMARY OF THE DISCLOSURE

It is therefore an object of this invention to provide a method and apparatus for selecting a single telephone line from among a plurality of lines in a multi-pair grouping and to isolate that selected line from subscriber equipment in order to perform tests on same.

It is another purpose of this invention to perform such selection and isolation more rapidly than is possible using the teachings of the prior art.

A further purpose of the invention is to conduct such selection without the need for personnel to be present at the subscriber location.

These and other objects are achieved in the present invention by employing the method and apparatus disclosed herein. The telephone company central office selects a line to be tested, and transmits a check tone, preferably at a frequency of 2713 hz., over that line. A selection and isolation module, located at the line termination point, is connected to each of the lines. Under microprocessor control, a given line is selected for scanning by inputting appropriate control signals to a multiplexer, and signals from this line are appropriately filtered to eliminate signals lying outside the general frequency of the check tone. The selected line then is scanned for a short time interval, such as 25 ms. This check, having a bandpass accuracy of about ±100 hz., is sufficient to give an initial indication of the presence of a check tone on the selected line, but not sufficiently accurate to validate that selection. If a signal is detected within the short time interval, the control unit continues to monitor the selected line for a longer time interval, such as 0.5 seconds. This time interval is sufficient to give an accuracy well within ±10 hz. If the check tone is detected during this long period, the system continues monitoring for a succession of such long intervals, preferably six intervals. Presence of the detected signal during this succession of long intervals validates the presence of the check tone and indicates that the line being scanned is the line selected by the central office. At that point, the control unit disconnects the line from subscriber equipment and connects it to a tone generator located within the apparatus in order to send a succession of test tones to the central office, enabling evaluation of the line quality. The invention thus is capable of identifying a single line from a 25-line group in a maximum test period of 3.875 seconds, as opposed to the minimum period available under the prior art of 100 seconds.

DETAILED DESCRIPTION OF A PREFERRED EMBODIMENT

Figure 1:
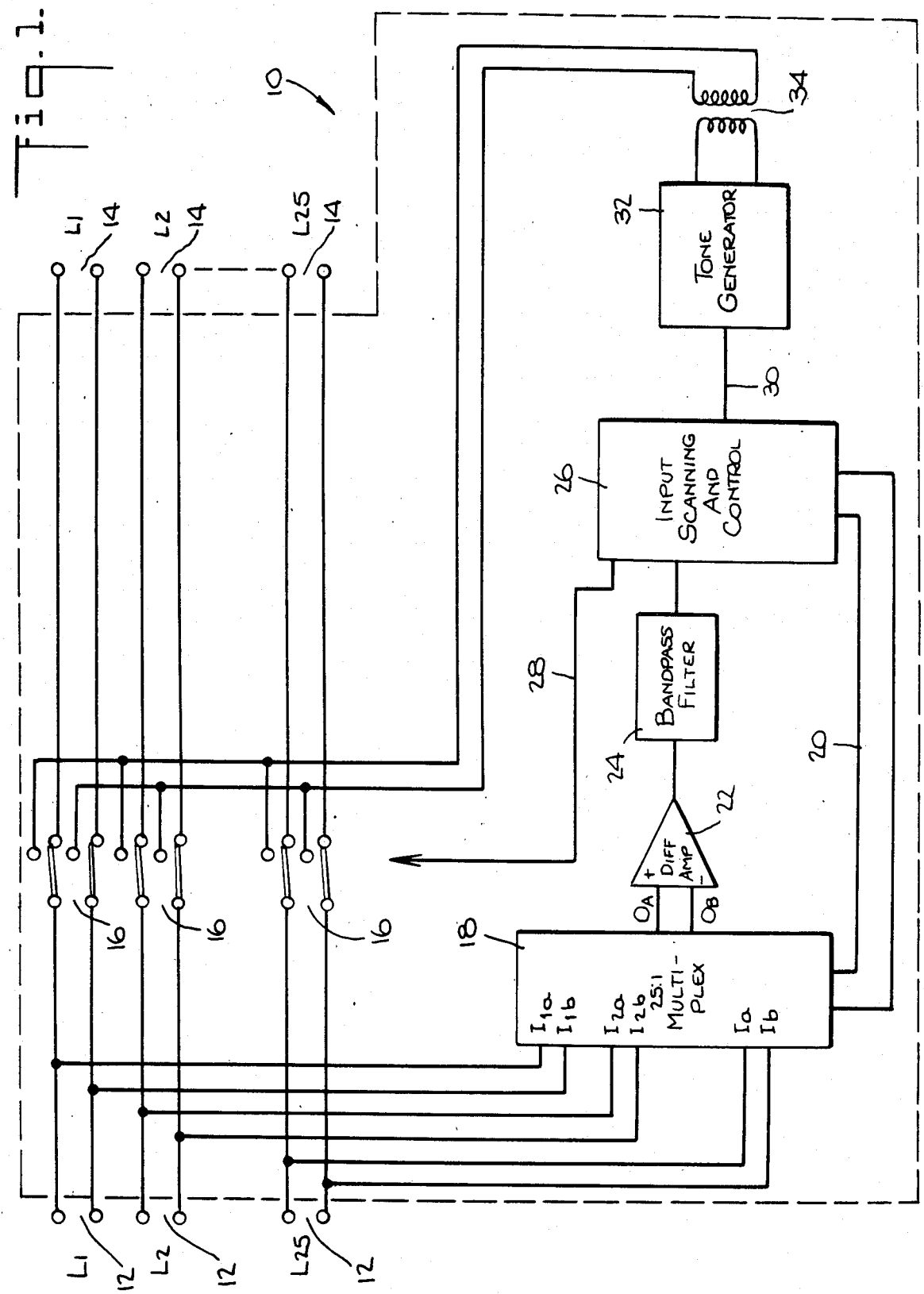
FIG. 1 is a block diagram depicting the components of a preferred embodiment of the invention.

FIG. 1 schematically depicts a preferred embodiment 10 of the present invention. Typically, the device is contained in an enclosure 11, as shown, and the module is mounted at a line termination point. An input/output means connects each incoming line pair to a respective subscriber line. In the embodiment shown, input terminals 12 are connected to 25 incoming lines $L_1$–$L_{25}$, accomodating a conventional 25-line termination block. Each terminal includes two contacts, relating to the tip and ring lines of normal equipment. (In conventional usage, as followed herein, the term "line" includes the tip and ring lines of a line pair). Although the conventional 25-line arrangment is shown, the module could be configured to handle other numbers. Thus, each input terminal 12 is connected to the telephone company central office.

Output terminals 14 are connected to subscriber equipment by conventional lines (not shown). Each input terminal also is connected to a corresponding output terminal through a double-pole, double-throw relay 16. Such relays may be conventional devices known to the art, and are connected such that in their normal position the output and input terminals of a given line are interconnected.

At a point between the input terminal and the relay, each line also is connected to a means for selecting an individual line as the evaluation line for test, such as multiplexer 18. Each line is provided two input ports, so that, for example, line $L_1$ is connected to input ports $I_1a$ and $I_1b$ and so forth, as shown. The multiplexer can be any of a number of devices known to the art, capable of receiving 25 paired inputs on input ports $I_1a$ and $I_1b$ through $I_{25}a$ and $I_{25}b$, and selecting one of those pairs of inputs as an evaluation line output output on output terminals $0_a$ and $0_b$. Sequencing signals to select the input ports to be gated to the output ports are input via control bus 20. Although the multiplexer is shown as a single functional unit, those in the art will appreciate that several discrete components perform this function. In the embodiment shown, the multiplexer preferably comprises one 4052 module per four line pairs. The input impedance of this device is sufficiently high that no loading of the line occurs. Input ports can be accessed in any order desired, of course; in the illustrated embodiment, the preferred sequence is to step through the sequence $L_1$–$L_{25}$, as explained below.

The outputs from the multiplexer, consisting of signals from the evaluation line, are connected to the input terminals of differential amplifier 22. This device, which may be a conventional operational amplifier such as an LN358, performs an initial filtering function, in that its output consists only of signals which appear on one side of the line, but not the other. Thus, a certain amount of line noise, etc., can be eliminated. As preferably connected, this device performs no amplification, but rather serves as an interface between the line and the remainder of the circuit.

The output of the differential amplifier is fed to the input of a filter means, bandpass filter 24. Preferably, this is a switched-capacitance type device, such as the model MF-5, manufactured by National Semiconductor Corp., selected for a frequency of 2713 hz. This component rejects the common mode noise generally present on a line.

Control and detection means 26 receives a filtered signal from the bandpass filter 24 as an input. Preferably, this device is a microprocessor, such as a type 8048, readily available to the art. Of course, other microprocessor devices could be incorporated into a circuit within the scope of this invention. Outputs from the control unit include sequencing signals fed to control bus 20, described previously, and a "commence test" signal output via control lines 28, connected to each relay 16. Also, a generator bus 30 connects the control unit to a tone generator 32. This generator can be any conventional device that generates tones in the general range 300–3000 hz, responsive to control signals applied on the generator control bus. The output tones of the generator are coupled to the normally-open terminals of relays 16. This coupling may be accomplished conveniently through a transformer 34, as will be appreciated. This connection conveniently can be made to all of the normally-disconnected terminals in parallel, as only one such relay will be activated at a time, as explained in more detail below. Operation of the microprocessor takes place under the control of a program retained in the ROM (Read-Only Memory) portion of the microprocessor.

Figure 2:
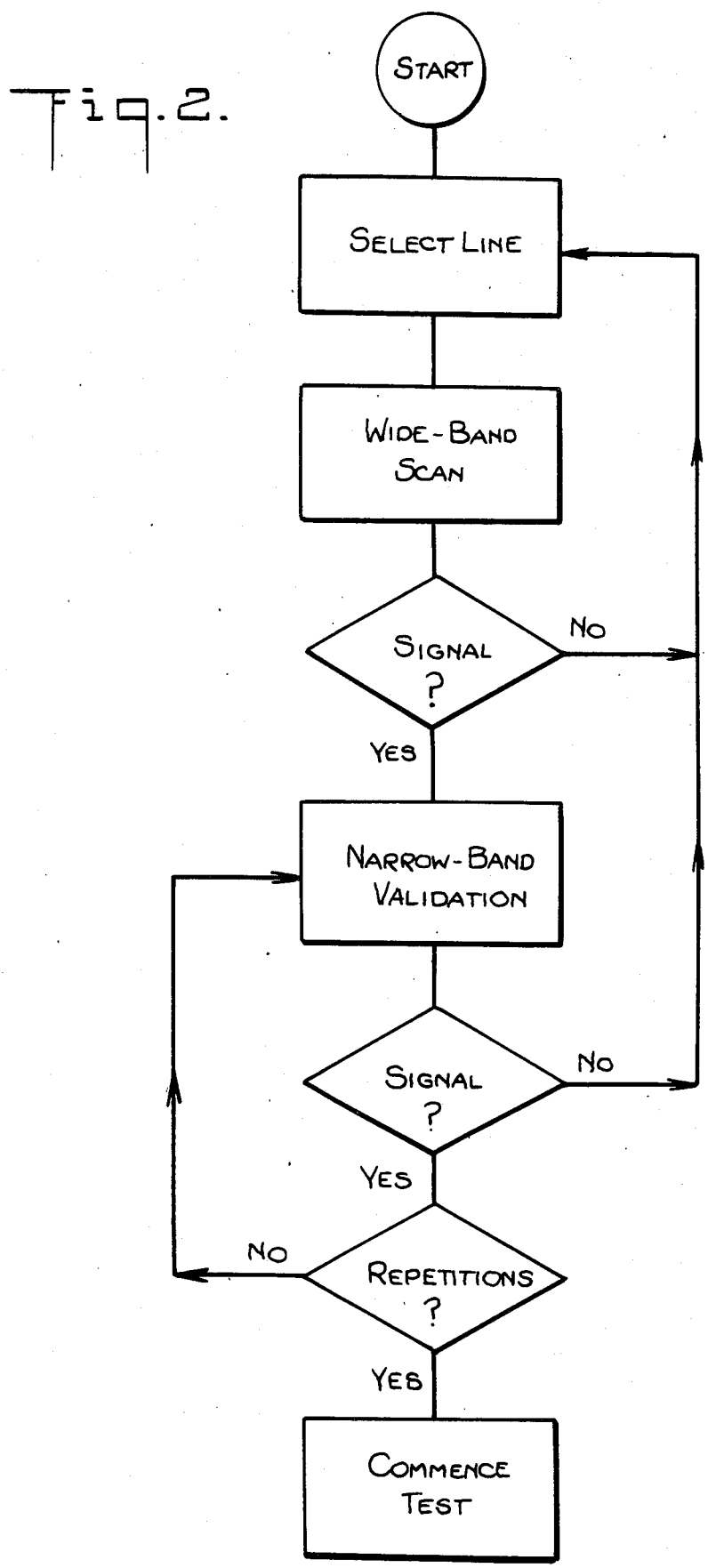
FIG. 2 is a flow chart depicting general operation of the embodiment shown in FIG. 1.

Before considering operation of this embodiment in detail, it will be helpful to consider operation of the present invention in a more general form, as shown in the flowchart of FIG. 2. It will be familiar to those in the art that conventional wisdom teaches that one must monitor a given line for at least four seconds, and preferably ten seconds, in order to detect and validate a check tone. This requirement stems from the fact that signals in many forms may be present on a given line, ranging from an on-going conversation, to cross-talk, to random transients. Therefore, before commencing line tests, it is important to insure that a signal received is in fact the check tone being transmitted by the central office. To date, the art's only solution to that problem has been to receive the signal for a significant period of time before validating the same as the check tone.

The present invention overcomes that problem by dividing the reception time into a number of discrete intervals and operating in two modes: an initial detection mode and a validation mode. As shown in FIG. 2, after selecting a line, the system performs an initial detection. In this step, the system determines whether any signal is present within the general frequency range of the check tone, before taking the time necessary to validate that the detected signal is in fact the check tone. It has been found that a range of ±100 hz for the initial detection band yields acceptable results for such a scan. Because accuracy of digital frequency measurement is directly dependent upon the measurement duration, this operation can be performed in a very short time interval, in the millisecond range. A scanning time of 25 ms has been found effective for this step.

If no signal is found during the initial detection mode, the system can proceed to select a new evaluation line by directing a sequencing signal from the microprocessor to multiplexer 18, moving rapidly from one line to another when no signals are present. A settling time for the bandpass filter, typically about 10 ms, must be allowed after selecting a new line. Thus, the total time required to perform this initial scan is 35 ms.

When a signal is detected, the system switches to a validation mode. Here, the objective is to identify a check tone positively, so a narrower validation band is employed. The industry standard of accuracy in tone identification is ±10 hz, but it has been found that the present invention can achieve significantly more accurate frequency measurement than required by that mandate. It remains true that some time must be expended in the validation step to insure that the detected signal is in fact the check tone, but the present invention has revealed that spurious signals tend to disappear well inside this time period. Therefore, the present invention divides the validation step into a number of relatively short repetitions, which may be termed "long time intervals" in comparison with the "short time intervals" used in the initial detection mode.

Combining the requirements for signal duration and those of accuracy, it is preferred to conduct validation in 0.5 second intervals, that being sufficient to achieve an accuracy of about ±1 hz. Six repetitions of this frequency measurement step are conducted, and that number has been found to produce consistent and accurate identification results. If the signal disappears after any one of these intervals, the system reverts to the intitial detection mode, returning to the "select line" step. Thus, the present invention scans a large number of lines in a very short time, entering validation mode only when a signal is present during initial detection.

Figure 3:
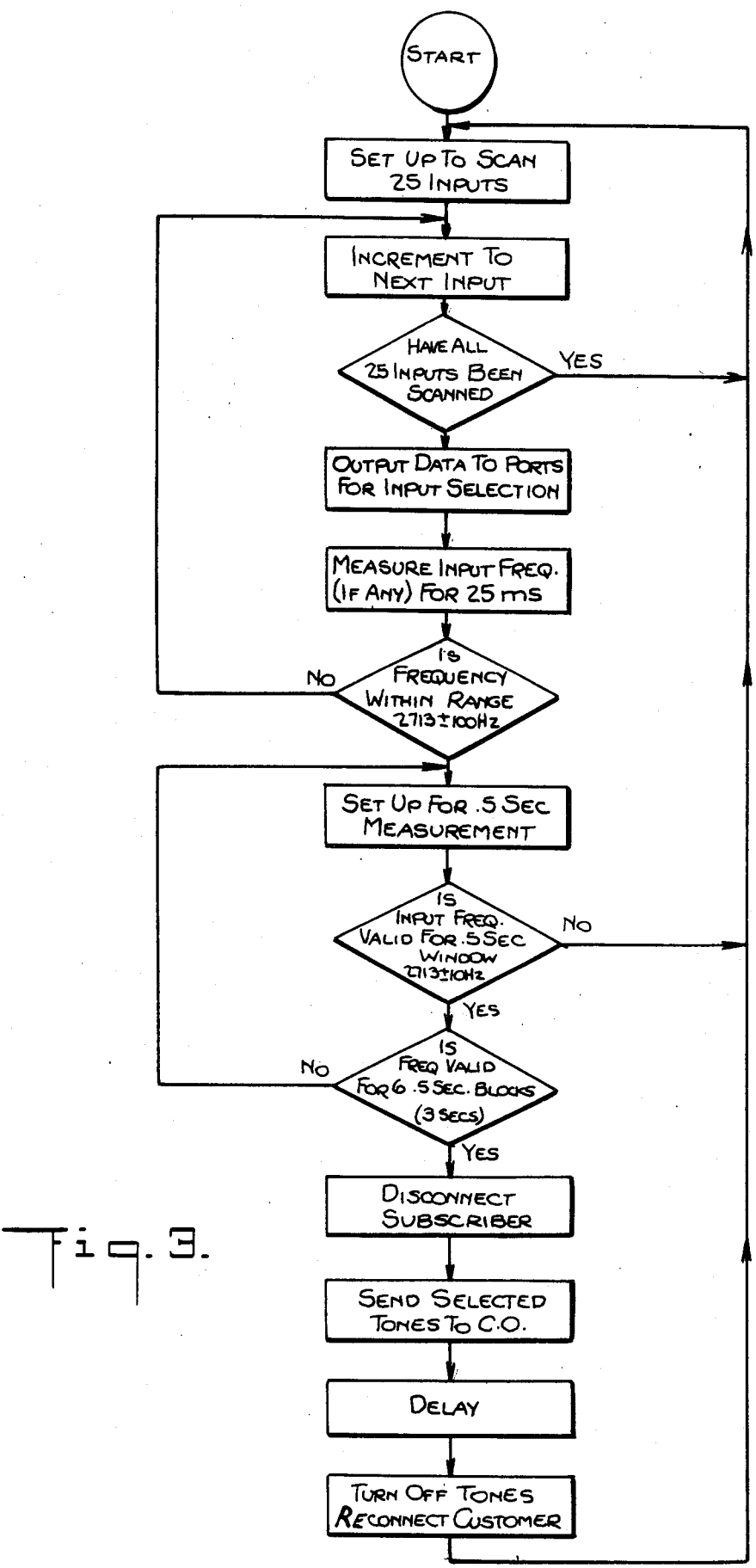
FIG. 3 is a flow chart depicting detailed operation of the emoodiment shown in FIG. 1.

A more detailed understanding of the operation of the embodiment shown in FIG. 1 can be gained from the flowchart of FIG. 3, showing in greater detail the operational steps of the program stored in microprocessor 26. The module shown is adapted to detect a check tone of 2713 hz, a frequency often used by the industry for such testing. The system could, of course, be adapted to any chosen frequency. As shown, the unit commences operation by an initialization step, in which the system is configured to scan 25 inputs sequentially. An evaluation line is selected when the microprocessor outputs the appropriate codes to the multiplexer 18 on the control bus 20, as seen in FIG. 1. The system then pauses for 10 ms to allow the differential amplifier and band pass filter to settle. Then, the microprocessor 26 measures the input frequency of any signal present for 25 ms. If no frequency is detected, the routine returns and increments to the next input.

If, however, a signal is detected, the system moves into the validation mode, looking for a signal of 2713 ±10 hz in 0.5 second increments. The program performs six iterations of this measurement, and if no signal is found after any of these increments, the routine loops back to begin the scan anew.

When the system does validate the detected signal as the check tone, it moves into a testing mode. First, a "commence test" signal on the appropriate control line 28 disconnects the telephone line from the subscriber line, establishing connection with the tone generator 32. Then, the microprocessor directs the tone generator through a testing sequence incorporated in the program. Such test sequences are well-known in the art, and need not be discussed in detail here. For example, the system could send a 1010 hz tone for 48 seconds, remain quiet for a period such as about 5 minutes, and then send another 1010 hz tone for 5 seconds. Another sequence might use a variety of tones, such as a 1010 hz tone for 20 seconds, followed by a 404 hz tone for 20 seconds, a 2804 hz tone for 20 seconds, a quiet term of 5 minutes, and finally a 1010 hz tone for 5 seconds. A single test sequence can be provided, or users can be offered a choice among several sequences, selectable, for example, by a dip switch. Other capabilities, such as providing for termination of the testing upon transmission of a tone from the central office, will be evident to those in the art.

Figure 4:
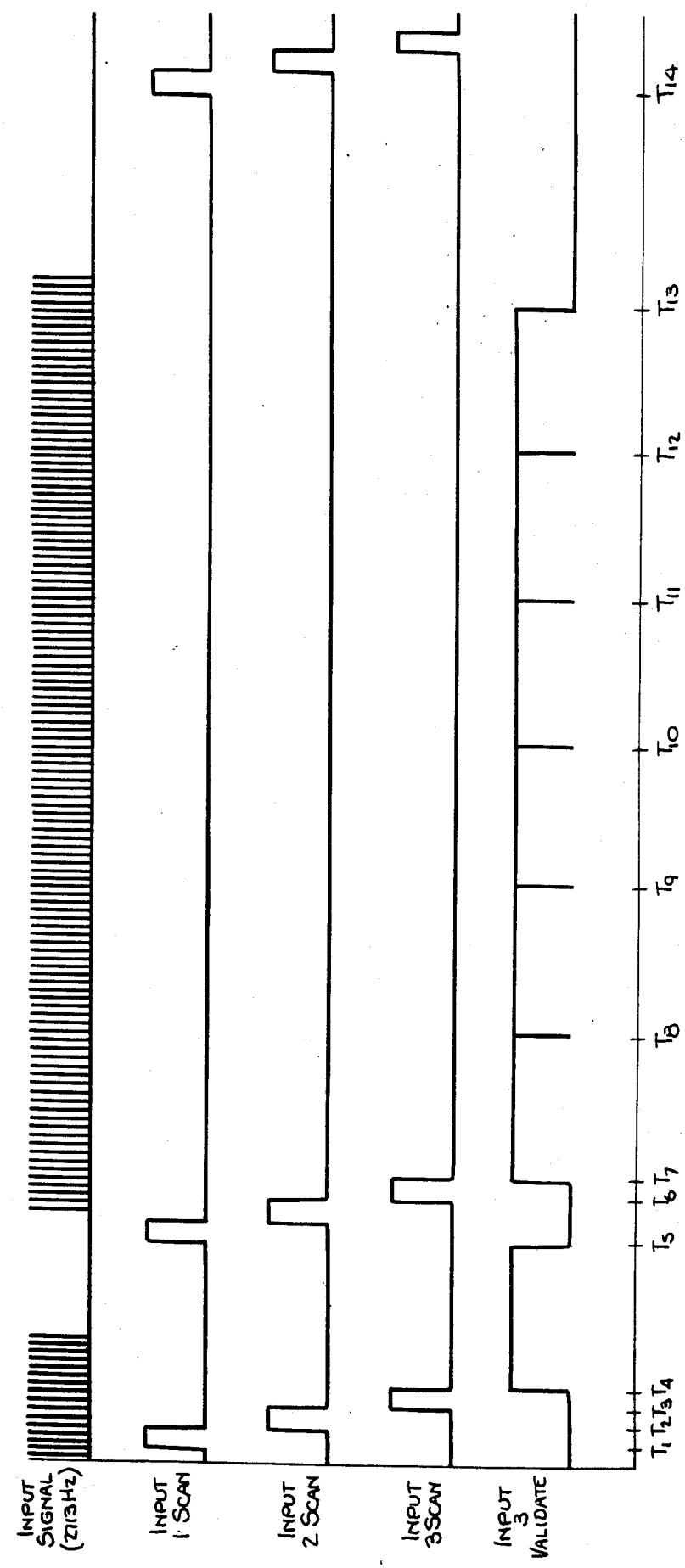
FIG. 4 is a graphic depiction of the system in operation.

An example of the system in operation is shown graphically in FIG. 4. Of course, the time line shown is not drawn to scale, given the disparity in the intervals shown. Also, it should be noted that only three input lines are included in the figure, for purposes of clarity. The top line shows the check tone of 2713 hz. being transmitted by the central office on line $L_3$, with a short interruption during the period T4–T5. As discussed, the module begins initial detection by scanning the first input line ($L_1$) and then increments the number of the line being scanned. At $T_1$, the system scans line $L_1$ for a total of 35 ms (10 ms setting time and 25 ms scan time). Seeing no applied signal, the system moves on to line $L_2$ (T2), where again no signal is found. On line $L_3$, however, a signal within the bandwidth 2713 hz ±100 hz is detected (T3), so the unit begins the validation mode, at point T4. During the first 0.5 second period, however, the signal disappears (as shown on the top line). The validation having failed, the system returns to the initial detection mode, starting with line $L_1$. From T5 to T7 the process repeats, with a signal again being detected on line $L_3$. Again the system tries to validate the signal as the check tone, and on this occasion, the signal remains present at each of the periods marked by T8–T13 The microprocessor thus decides that the signal is the check tone, and disconnects line $L_3$ from the subscriber and performs the test cycle, as described. At T14, the testing completed, the system returns to the "scan" mode.

This embodiment can scan a large number of lines and identify a check tone very rapidly. Taking the most difficult case, that of a check tone present on line $L_{25}$, this embodiment would identify that line and commence testing in 3.875 seconds—that is, 25 ms scan time plus 10 ms settling time per line, plus the 3 second validation period. The prior art would require preferably 250 seconds to perform this operation, and the minimum stated time for same is 100 seconds. Manifestly, this invention offers significant improvements over test apparatus heretofore available.

It will be appreciated by those in the art that various modifications to the system can be made. For example, other components could be substituted for the multiplexer and control unit to provide for fewer or more lines, as desired. These and other modifications can be accomplished within the scope of the present invention, which is defined solely by the claims appended hereto.

I claim:

1. A method for identifying and isolating a selected telephone line from among a plurality of telephone lines at a location remote from the central office, comprising the steps of:

transmitting a signal on the selected telephone line from the central office, at a preselected frequency;

monitoring the input from one selected line of the plurality;

filtering said input to reject signals outside a preselected frequency band;

measuring the frequency of said input for a preselected short time interval, sufficient to determine a frequency measurement within a preselected initial detection band within said frequency band to detect a signal within the range of said initial detection band;

incrementing said sequence and returning to said monitoring step if no signal is detected within said initial detection band;

continuing to measure the frequency of said input for a preselected long time interval of sufficient duration to determine a frequency measurement within a preselected validation band within said initial detection band, to detect a signal therein in instances in which a said detected signal is detected during said measuring step;

looping back to said incrementing step if no signal is detected within said validation detection band;

reiterating said continuing step a predetermined number of times; and isolating the selected line from the subscriber equipment.

2. The method of claim 1 wherein said transmitted signal is a one signal.

3. The method of claim 2, wherein said preselected frequency is 2713 hz.

4. The method of claim 1, wherein said initial detection band is the frequency of said transmitted signal, ±100 hz.

5. The method of claim 4, wherein said short time interval includes a settling period sufficient to allow stable frequency measurement.

6. The method of claim 5, wherein said short time interval is about 35 ms.

7. The method of claim 1, wherein said long time interval is about 0.5 seconds.

8. The method of claim 1, wherein said validation band is the frequency of said transmitted signal ±10 hz.

9. The method of claims 1, 5, 6, 7 or 8, wherein said number of times is six times.

10. Apparatus for identifying and isolating a selected telephone line from among a plurality of telephone lines at a location remote from the central office, upon the application of a test signal to the selected line, comprising:

input/output means coupling each line of the plurality of lines to a respective subscriber line;

line selection means coupled to said input/output means, for selecting an evaluation line in a preselected sequence from among the plurality of lines in response to an input sequencing signal, and providing signals from said evaluation line as an evaluation output;

filter means coupled to said line selection means for filtering said evaluation output within a preselected wide frequency band and providing a filtered signal output;

control and detection means coupled to said filter means, operational in an initial detection mode for detecting the presence of an initial detection signal in an initial detection band within said wide frequency band during a preselected short time interval and, upon detection of said initial detection signal, operational in a validation mode for detecting the presence of a validated test signal by detecting the presence of a validation signal lying in a validation band within said initial detection band during a preselected number of sequential long time intervals, for providing as an output a "commence test" signal upon detection of said validated test signal or a said input sequencing signal upon failure to detect a said initial test signal during said short time interval or a said validation signal during any said long time interval; and isolation means coupled to said control and detection means and to said input/output means, for disconnecting said evaluation line from said respective subscriber line in response to said "commence test" signal.

11. The apparatus of claim 10, further comprising test means for performing preselected tests on the selected line.

12. The apparatus of claim 10, wherein said line selection means is a multiplexing means having a plurality of input ports connected to individual telephone lines, control points connected to said control and detection means, and an output port connected to said filter means.

13. The apparatus of claim 10 wherein said control and detection means is a microprocessor, operational under program control.

14. The apparatus of claim 10, wherein said initial detection band is the frequency of the test signal ± about 100 hz.

15. The apparatus of claim 10, wherein said short time interval includes a settling period sufficient to allow stable frequency measurement and a frequency measurement period.

16. The apparatus of claim 15, wherein said short time interval includes a settling time of about 10 ms and a frequency measurement time of about 25 ms.

17. The apparatus of claim 10, wherein said validation band is the frequency of the test signal ± about 10 hz.

18. The apparatus of claims 10, 14, or 17, wherein the frequency of the test signal is about 2713 hz.

19. The apparatus of claim 10, wherein said number of long time intervals is about six times.

* * * * *